No. 806,404. PATENTED DEC. 5, 1905.
H. G. ELFBORG.
LOCK NUT.
APPLICATION FILED OCT. 12, 1903.
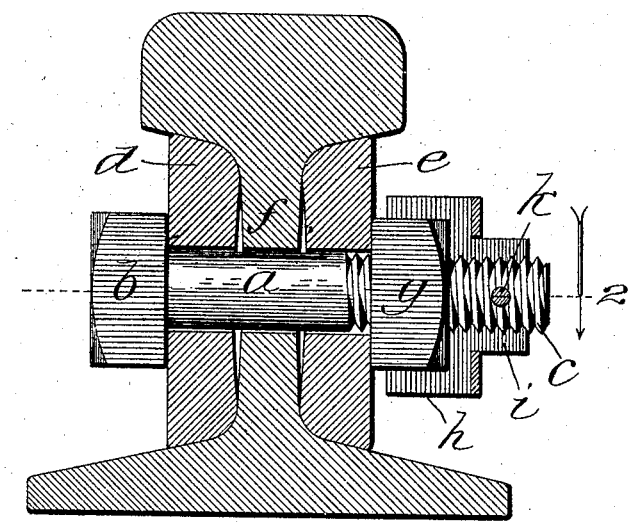
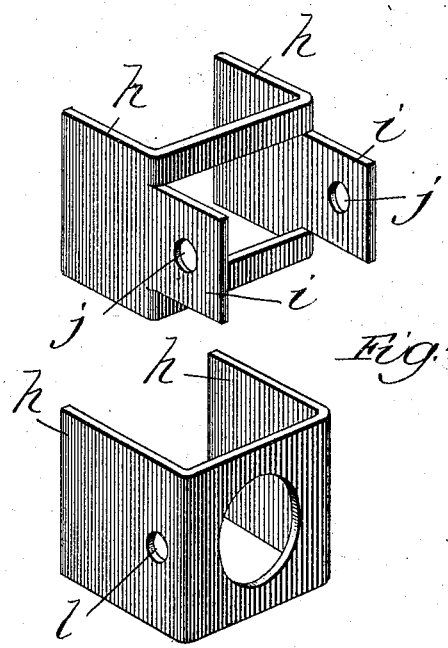
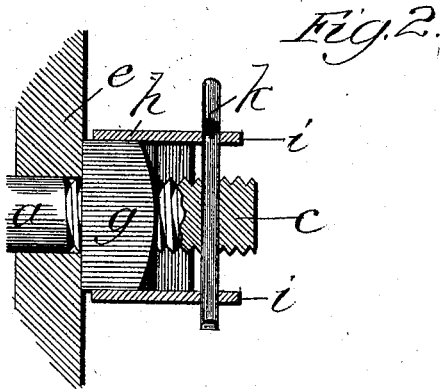
Witnesses:
Inventor,
Henry G. Elfborg,
By Thomas F. Sheridan,
Atty.

UNITED STATES PATENT OFFICE.

HENRY G. ELFBORG, OF CHICAGO, ILLINOIS.

LOCK-NUT.

No. 806,404.        Specification of Letters Patent.        Patented Dec. 5, 1905.

Application filed October 12, 1903. Serial No. 176,755.

*To all whom it may concern:*

Be it known that I, HENRY G. ELFBORG, a citizen of the United States, residing at Chicago, in the county of Cook and State of Illinois, have invented certain new and useful Improvements in Lock-Nuts, of which the following is a specification.

The invention relates to that class of mechanisms which are designed to hold a threaded nut in engagement with a threaded bolt and prevent independent rotation of the parts—in other words, to lock the parts against independent rotations, as will more fully hereinafter appear.

The principal object of the invention is to provide a simple, economical, and efficient nut-lock that will prevent independent rotations of a threaded nut and bolt.

The invention consists principally in the combination of a threaded bolt, a threaded polygonal nut in engagement therewith, a flanged retainer or lock in engagement with the polygonal surface of the nut, and means for securing the flanged retainer to the bolt portion, substantially as described.

The invention consists, further and finally, in the features, combinations, and details of construction hereinafter described and claimed.

In the accompanying drawings, Figure 1 is a cross-section of a railway-rail and fish-plates, showing my improved lock-nut mechanism as it appears when in engagement therewith; Fig. 2, a longitudinal sectional detail taken on line 2 of Fig. 1 looking in the direction of the arrow; Fig. 3, a perspective view of the retainer removed from engagement with the nut and bolt, and Fig. 4 a perspective view of a modified form of retainer.

In the art to which this invention relates it is well known that it has long been desired to get a satisfactory, simple, and economical locking mechanism that will prevent independent rotations of a nut and bolt, or, in other words, prevent the unlocking of the same after they have been tightened in position. To this end this invention is principally designed, as will more fully hereinafter appear.

In illustrating and describing my improvements I have illustrated and described them in connection with a railway-rail and "fish-plates," as showing one type of a short-headed bolt. It will be understood, however, that it may be used in a great many different ways and for a variety of purposes, all of which will be understood and appreciated by those skilled in the art.

In constructing lock-nut mechanisms in accordance with these improvements I make a bolt portion $a$, preferably provided with a head portion $b$ and having one end threaded, as at $c$. The threaded end of the bolt is also perforated, as will more fully hereinafter appear. This bolt, as shown in Fig. 1, is passed through the perforated fish-plates $d$ and $e$ and the rail-web $f$. To secure the parts together and prevent release of the same except when desired, a threaded nut portion $g$ is provided and placed in threaded engagement with the threaded end of the bolt, so as to firmly clamp the parts above described together.

To prevent independent rotation of the parts—*i. e.*, the bolt and nut—in other words, to prevent unlocking of the same except when desired, a flanged metallic retainer or lock portion is provided and preferably made, as shown in Figs. 3 and 4, in a U-shaped channel portion having forwardly-extending retainer-flanges $h$ and, as shown in Fig. 3, rearwardly-extending flanges $i$, bearing the perforations $j$. The retaining flanged portions are of a depth at least equal to and preferably deeper than the thickness of the polygonal nut, so as to permit adjustment of nut and bolt—that is, the nut may be turned backward or forward to any desired position on the bolt without disturbing the final relation of the flanged retainer and the bolt. A locking-pin $k$ is provided and passed through the perforations in the retainer and threaded bolt. This pin, as shown in Fig. 1, is preferably made in the shape of a split pin, one end of which may be looped and the other end divided, so as to be turned, as is usual in cases of such pins, to prevent ordinary displacement.

In Fig. 4, as hereinabove stated, the flanged retainer is made considerably deeper than in Fig. 3, so that the perforations $l$ may be made through the inner portions of the retaining-walls instead of being independent rearwardly-extending flanges, as shown in connection with Figs. 2 and 3.

I claim—

1. In lock-nut mechanism, the combination of a perforated threaded bolt, a threaded polygonal nut mounted in threaded engagement therewith, a retainer in non-rotatable engagement with the nut and formed of a single piece of metal having a web portion perforated to receive the bolt and integral bent flanges extending at an angle to such perforated web portion from its outer edges provided with perforations therethrough for receiving the locking-pin, and a locking-pin passed through such perforations in the retainer-flanges and bolt, substantially as described.

2. In lock-nut mechanism, the combination of a perforated threaded bolt, a threaded polygonal nut in engagement therewith, a retainer having a central web portion perforated to receive the bolt, integral flanges extending forwardly from such web portion in engagement with the nut and integral perforated flanges struck up from the central web portion extending rearwardly therefrom all formed of one piece of sheet metal bent to form such flanges, and pin mechanism passed through the perforated flanges of the retainer and through the perforation in the threaded bolt to prevent independent rotation of the parts, substantially as described.

3. In lock-nut mechanism, the combination of a perforated threaded bolt, a threaded polygonal nut in engagement therewith, a retainer having a centrally-perforated web portion and integral perforated rear lugs struck up from the central web portion and extending at an angle thereto and forward lugs engaging the polygonal nut, and a locking-pin passed through the perforations in the retainer and bolt, substantially as described.

4. In a lock-nut mechanism, a retainer formed of a single piece of metal having a web portion perforated to receive a bolt, integral bent flanges extending at an angle to such perforated web portion from opposite outer edges thereof provided with perforations for receiving a locking-pin, integral flanges extending from opposite edges of the perforated central web portion in the opposite direction from the perforated flanges and at an angle to such perforated flanges and central web portion, for engaging the nut to be secured thereby, substantially as described.

5. In a lock-nut mechanism, a retainer formed of a single piece of metal having a web portion perforated to receive a bolt, integral bent flanges extending at an angle to such perforated web portion from opposite outer edges thereof provided with perforations for receiving a locking-pin, integral flanges extending from opposite edges of the perforated central web portion in the opposite direction from the perforated flanges and at an angle to such central web portion, for engaging the nut to be secured thereby, and a locking-pin extending through such perforated flanges adapted to engage the bolt, substantially as described.

6. In a lock-nut mechanism, the combination of a perforated threaded bolt, a nut mounted in threaded engagement therewith, a retainer mounted in non-rotatable engagement with the nut and formed of a single piece of metal having a web portion perforated to receive the bolt, integral flanges extending at an angle to such perforated web portion from opposite outer edges thereof in one direction, integral flanges extending from the perforated central web portion in an opposite direction and in engagement with the nut, and a locking-pin extending through the perforated flanges and in engagement with the perforated bolt, substantially as described.

7. In a lock-nut mechanism, a retainer formed of a single piece of sheet metal having a perforated web portion, integral lugs struck up from such web portion extending at an angle thereto and provided with perforations for receiving a securing-pin, and flanges extending from opposite edges of such web portion adapted to engage the nut to be secured thereby, substantially as described.

HENRY G. ELFBORG.

Witnesses:
 THOMAS F. SHERIDAN,
 HARRY I. CROMER.